United States Patent
Lau et al.

(10) Patent No.: US 10,782,686 B2
(45) Date of Patent: Sep. 22, 2020

(54) SYSTEMS AND METHODS FOR OPERATING ROBOTS INCLUDING THE HANDLING OF DELIVERY OPERATIONS THAT CANNOT BE COMPLETED

(71) Applicant: SAVIOKE, INC., San Jose, CA (US)

(72) Inventors: Tessa Lau, Sunnyvale, CA (US); Philipp Herget, Sunnyvale, CA (US)

(73) Assignee: Savioke, Inc., San Jose, CA (US)

( * ) Notice: Subject to any disclaimer, the term of this patent is extended or adjusted under 35 U.S.C. 154(b) by 0 days.

(21) Appl. No.: 15/420,065

(22) Filed: Jan. 30, 2017

(65) Prior Publication Data
US 2017/0364074 A1    Dec. 21, 2017

Related U.S. Application Data

(60) Provisional application No. 62/288,240, filed on Jan. 28, 2016.

(51) Int. Cl.
| | | |
|---|---|---|
| G05D 1/00 | (2006.01) | |
| G06Q 10/00 | (2012.01) | |
| H04L 29/08 | (2006.01) | |

(52) U.S. Cl.
CPC .......... *G05D 1/0088* (2013.01); *G06Q 10/00* (2013.01); *H04L 67/12* (2013.01)

(58) Field of Classification Search
CPC .......... B25J 9/00; G05D 1/0088; H04L 67/12
See application file for complete search history.

(56) References Cited

U.S. PATENT DOCUMENTS

| | | | |
|---|---|---|---|
| 6,374,155 B1 | 4/2002 | Wallach et al. | |
| 6,584,375 B2 | 6/2003 | Bancroft et al. | |
| 7,066,291 B2 | 6/2006 | Martins et al. | |
| 8,010,230 B2 | 8/2011 | Zini et al. | |
| 9,152,149 B1 * | 10/2015 | Palamarchuk | ....... G05D 1/0234 |
| 9,395,723 B2 * | 7/2016 | Pari | ....... G05D 1/0276 |
| 9,412,280 B1 * | 8/2016 | Zwillinger | ....... G08G 5/0069 |
| 9,436,926 B2 * | 9/2016 | Cousins | ....... G06Q 10/087 |
| 9,535,421 B1 | 1/2017 | Canoso et al. | |
| 9,563,205 B2 | 2/2017 | Binney et al. | |
| 9,714,139 B1 * | 7/2017 | Aggarwal | ....... B64C 39/024 |
| 9,796,078 B2 * | 10/2017 | Angle | ....... B25J 5/007 |
| 9,898,638 B2 * | 2/2018 | Jones | ....... G06K 7/1417 |
| 2002/0198626 A1 | 12/2002 | Imai et al. | |
| 2003/0165373 A1 | 9/2003 | Felder et al. | |
| 2004/0015266 A1 | 1/2004 | Skoog | |
| 2005/0216126 A1 | 9/2005 | Koselka et al. | |

(Continued)

OTHER PUBLICATIONS

PCT International Search Report for International Application No. PCT/US16/15690, dated May 23, 2017.

(Continued)

*Primary Examiner* — Alex C Dunn

(57) ABSTRACT

Embodiments disclosed include methods for controlling the behavior of autonomously navigating delivery robots when items cannot be delivered. Methods can include receiving a request to proceed to a delivery location when a robot is at a first location. Attempting to deliver an item at a delivery location. If the robot determines delivery is successful, it autonomously navigates back to the first location. If the robot determines delivery of the item is not successful, it autonomously navigates to another location different from the first location.

17 Claims, 9 Drawing Sheets

(56) References Cited

U.S. PATENT DOCUMENTS

| | | | |
|---|---|---|---|
| 2007/0199108 A1* | 8/2007 | Angle | B25J 5/007 |
| | | | 318/568.12 |
| 2007/0288123 A1* | 12/2007 | D'Andrea | B66F 9/063 |
| | | | 700/214 |
| 2010/0042319 A1* | 2/2010 | Wu | G05D 1/0246 |
| | | | 701/408 |
| 2012/0041593 A1 | 2/2012 | Ichinose et al. | |
| 2012/0123614 A1* | 5/2012 | Laws | G05B 19/4189 |
| | | | 701/2 |
| 2013/0166108 A1* | 6/2013 | Sturm | B66F 9/063 |
| | | | 701/2 |
| 2013/0226344 A1* | 8/2013 | Wong | G05D 1/024 |
| | | | 700/258 |
| 2013/0238121 A1 | 9/2013 | Davey et al. | |
| 2015/0088310 A1 | 3/2015 | Pinter et al. | |
| 2015/0242806 A1* | 8/2015 | Cousins | G06Q 10/087 |
| | | | 700/237 |
| 2015/0274421 A1 | 10/2015 | Yamada | |
| 2016/0057925 A1* | 3/2016 | Letsky | A01D 34/008 |
| | | | 701/23 |
| 2016/0193732 A1* | 7/2016 | Breazeal | B25J 9/0003 |
| | | | 700/258 |
| 2017/0203446 A1* | 7/2017 | Dooley | B25J 19/023 |
| 2017/0326598 A1* | 11/2017 | Chelian | B07C 5/362 |
| 2017/0329333 A1* | 11/2017 | Passot | A47L 11/4011 |

OTHER PUBLICATIONS

PCT Written Opinion of the International Search Authority for International Application No. PCT/US16/15690, dated May 23, 2017.

* cited by examiner

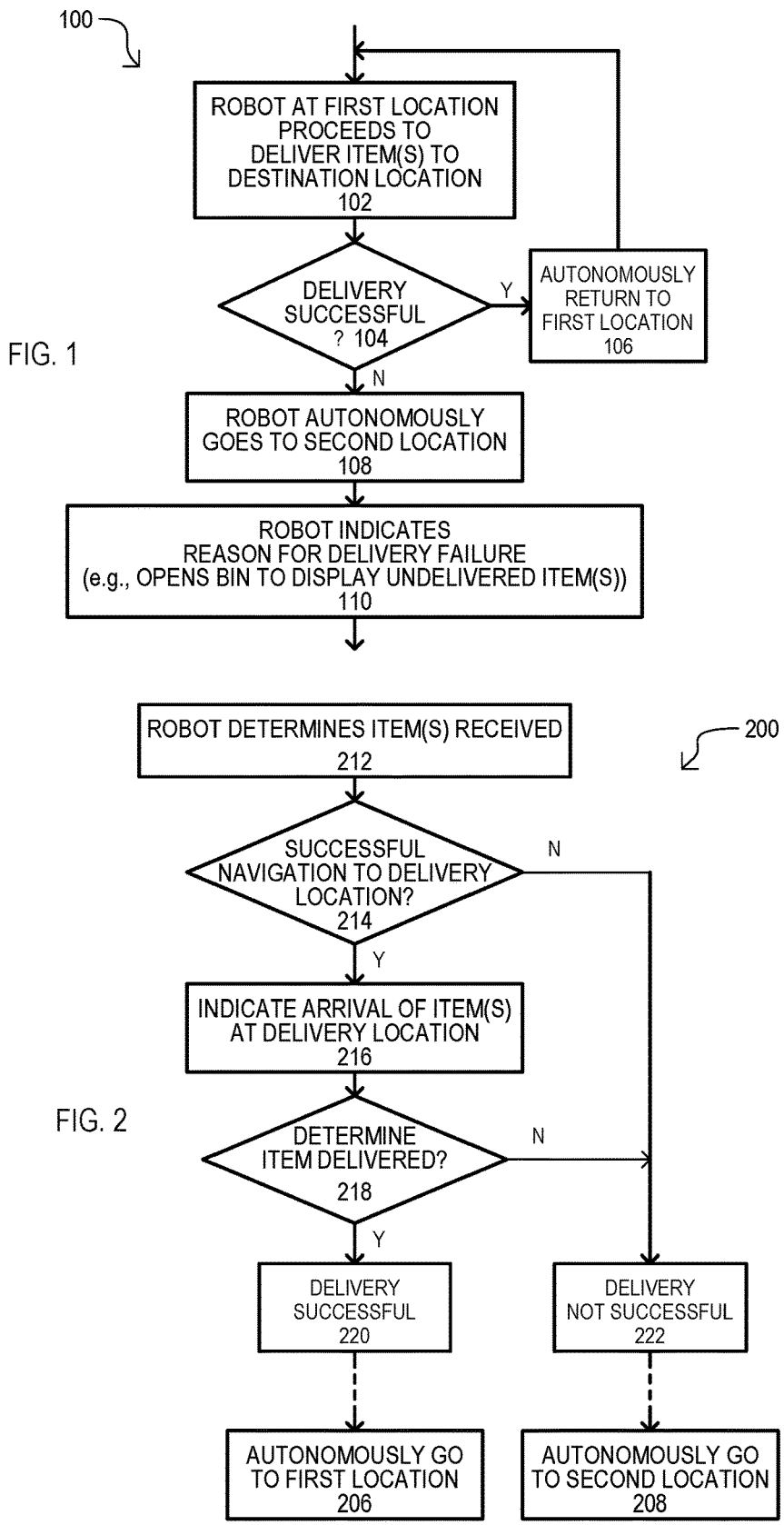

SYSTEMS AND METHODS FOR OPERATING ROBOTS INCLUDING THE HANDLING OF DELIVERY OPERATIONS THAT CANNOT BE COMPLETED

CROSS-REFERENCE TO RELATED APPLICATIONS

This application claims the benefit of U.S. patent application Ser. No. 62/288,240 filed Jan. 28, 2016, the contents of which are incorporated by reference herein.

TECHNICAL FIELD

The present disclosure relates generally to mobile robots, and more particularly to mobile robots that autonomously navigate to deliver items to delivery locations.

BACKGROUND

Effective and reliable robotic delivery systems for handling intermittent, on-demand, or scheduled deliveries of items in a wide variety of environments are needed. Ideally, delivery robots should be able to securely carry objects that can weigh as much or more than the robot, remain stable while moving, and have a configuration that prevents object damage or loss.

Robotic forklifts or pallet trucks have been used to move objects. However, such robotic systems are typically limited to factories or warehouses that support a highly-structured environment, requiring the use of designated trackways, or having preset physical or electronic guides throughout a building infrastructure to facilitate robot movement without interruption. Such conventional robots can use a minimal set of sensors because obstacle avoidance can be limited to stopping the robot when a mechanical or ultrasonic sensor indicates blocking of the designated trackway until a pathway is cleared.

Autonomous robots capable of delivering items in hotels, convention centers, apartment buildings, or similar facilities occupied by humans are in demand. Such robots need to navigate through highly variable corridors or rooms without human guidance. In some instances, deliveries may be interrupted or frustrated by obstacles that block or impede robot navigation to a delivery site, or by failure of a person to timely pick up a delivered item. Accordingly, systems and methods for handling such delivery interruptions or failures are needed.

BRIEF DESCRIPTION OF THE DRAWINGS

FIG. 1 is a flow diagram of a method according to an embodiment.

FIG. 2 is a flow diagram of a method according to another embodiment.

DETAILED DESCRIPTION

Figure 3:
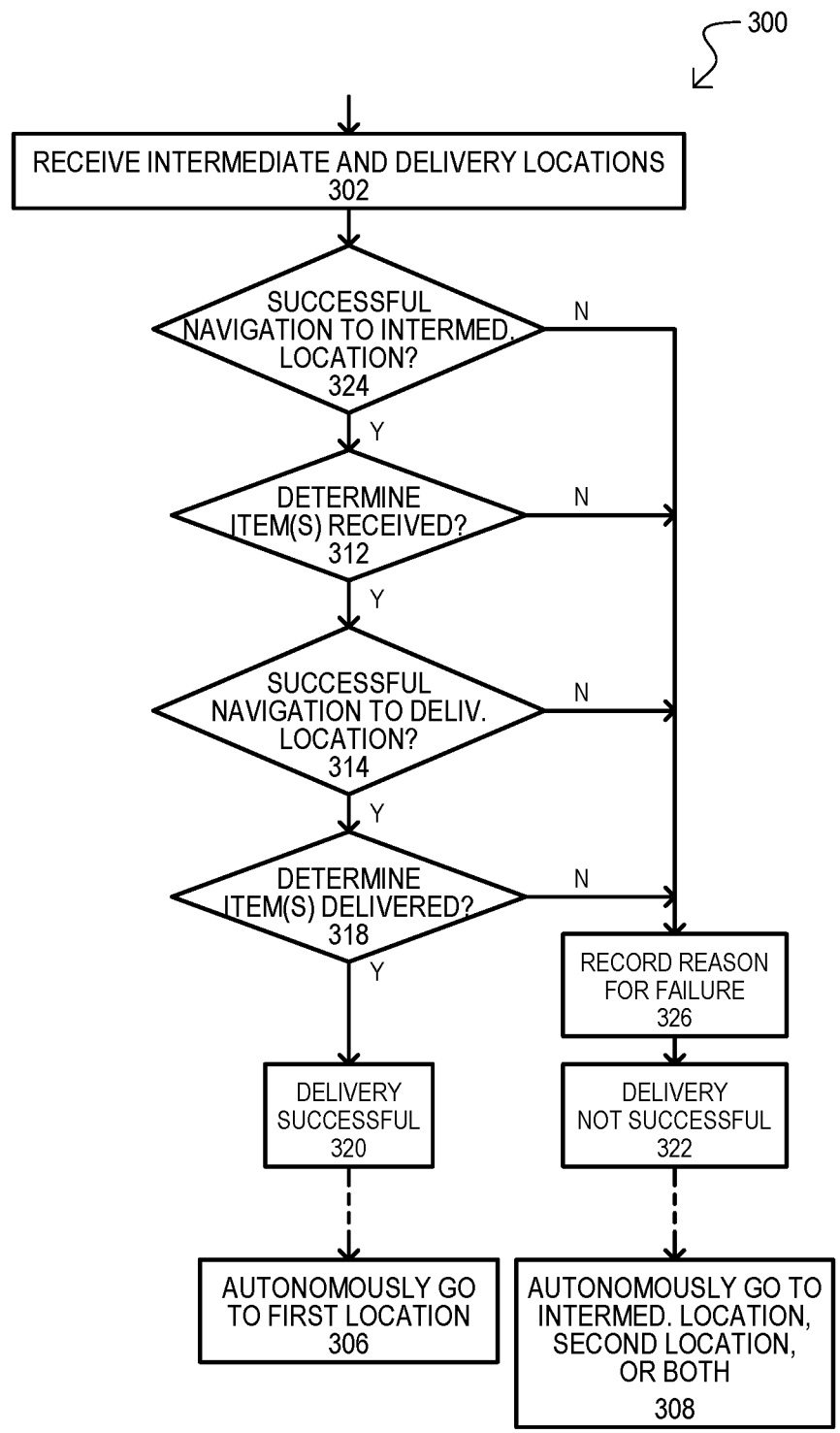
FIG. 3 is a flow diagram of a method according to a further embodiment.

Embodiments disclosed herein can include methods, robots, and systems for delivering items to various locations at a site, and taking predetermined actions in the event such items cannot be delivered. In particular embodiments, the delivery of an item can be considered unsuccessful when delivery is not possible due to circumstances, the delivery is interrupted or otherwise frustrated, or delivery is delayed beyond a predetermined time limit.

Embodiments can include mobile robots that can autonomously navigate through one or more environments, and are configured to transport items for delivery to one or more locations in the environments. Environments can include, but are not limited to, indoor or outdoor environments, such as hotels, convention centers, medical or care centers, indoor or outdoor restaurants, open air city plazas, or the like. Such mobile robots can include features which enable the transport of item(s), including but not limited to, lockable containers, securable or open cargo areas, bins, shelves, cavities, clip or ties, or other physical arrangements suitable for carrying deliverable items. In some embodiments, mobile robots can enable such items to be placed in a selected area, picked up by a person, or transferred to another robot or automated delivery system.

FIG. 1 is a flow diagram of a method 100 according to one embodiment. A method 100 can be executable by a robot and can include autonomous actions by the robot. A method 100 can include a robot that is located at a first location proceeding to deliver one or more items to a delivery location 102. In some embodiments, a first location can be a common starting and/or return location for a robot at an operating site. In a particular embodiment, a first location can be a charging/refueling site where a robot can return after its tasks have been completed. An operating site can be any suitable site, including but not limited to a hotel, a conference center, a care facility, or some other community.

In some embodiments, a robot can receive a request to deliver an item. Such a request can be received by a robot in any suitable fashion, including via a human interface on the robot, or via an electronic communication. In particular embodiments, a human interface can include a touch screen interface located on the robot, as will be described in more detail herein. An electronic communication can include, but is not limited to, communications via wireless network at the site, including a local area network, near field communication networks, a private of public cellular network, a wireless point-to-point connection, or even a wired connection that is removed once the robot is ready to travel. A request to deliver one or more items can take various forms, including but not limited to: a request to take an item that has been placed in or on the robot to a destination location; or a request to navigate to one or more intermediate locations before delivering the item. Such intermediate locations can include locations where an item can be received by the robot, or locations to navigate to on the way to deliver the item. In other embodiments a larger system can receive a delivery request, and direct robot movement in response to such a request.

Referring still to FIG. 1, a method 100 can include determining if the delivery of item(s) has been successful 104. Such an action can include detecting any of various circumstances that prevent or delay delivery of the item. Such circumstances can include extrinsic or intrinsic circumstances. Extrinsic circumstances can exist outside of the robot, including navigation obstacles, which can include, but are not to: equipment failure at the site (e.g., an elevator or automatic door is out of order, communication system down, etc.) or unavoidable or non-traversable obstacles encountered while attempting to navigate to the delivery location (e.g., corridor blocked by objects or crowds, the robot is tampered with, etc.). Extrinsic circumstances can also include delivery failures where the robot reaches the delivery location but the item is not delivered. Such delivery failures can include but are not limited to: a person at the delivery location fails to take the item, fails an authentication test, or does not pay as required. Extrinsic failures can also include exceeding a timeout limit, including a limit to waiting at the delivery location as well as a limit to overall delivery time. Intrinsic circumstances can exist within the robot including some system fault within the robot's control systems, including but not limited to: errors/corruption in navigation data, failures in the guidance system, etc. Circumstances can also be undetermined, for example, a robot may be unable to locate a particular place for an undetermined reason.

While a delivery location can be a stationary location, in other embodiments it can be a location that can move, such as a person or a supply cart, as but two of many possible examples.

As understood from above, a delivery may not be successful at various points in the delivery path including on the way to the delivery location, as well as at the delivery location itself. According to embodiments, navigation to the delivery location is an autonomous operation by the robot.

If delivery has been successful (Y from 104), a robot can autonomously return to the first location 106. As noted above, this can include a charging station or the like. In this way, a robot can be ready for a new task, having completed its previous task.

If delivery has not been successful (N from 104), a robot can navigate to a second location 108, understood to be different from the first location. In this way, the delivery task can be reinitiated, changed, or terminated. This can provide a higher level of service, quicker delivery times, and inform a site of obstacles that can present problems for other robots, or even guests. In some embodiments, a second location can include personnel that can assist in taking care of the delivery operation. In one very particular embodiments, a second location can be "front desk" of a hotel (or an equivalent location at a different type of site).

In some embodiments, a method 100 can further include the robot indicating the reason for the delivery failure 110. Such an action can include any of various levels of information. For example, delivery failure data can be as simple as indicating where the failure was considered to have occurred, or can be complex as imaging data capturing how/why the failure occurred. It is understood that indications of delivery failure (110) can occur at the second location, or can occur at the time/location of the failure (e.g., the robot can transmit a message). In particular embodiments, a robot can present itself and open a storage bin to indicate the item(s) were not delivered.

As noted above, requests for delivery executed by robots can take various forms. One form of a delivery request can include a delivery when the robot is loaded with the delivery items when it receives the delivery requests (i.e., it does not have to travel to pick up the delivery item). One such embodiment is shown in FIG. 2.

FIG. 2 is a flow diagram of a method 200 according to another embodiment. A method 200 can be executable by a robot and can include autonomous actions by the robot. In a very particular embodiment, method 200 can be one implementation of the "delivery successful determination" operation shown as 104 in FIG. 1.

A method 200 can include a robot determining item(s) have been received 212. Such actions can include a robot using sensors and/or receiving an input indication that item(s) have been loaded. In particular embodiments, such an action can include receiving an indication via a human interface on the robot. In addition or alternatively, such an action can include a robot sensing the opening and/or closing of a lid/door for a container on the robot, or sensing the presence of item(s) at a storage location on the robot. Such sensing of times can include but is not limited to using optical sensor, weight sensors, or pressure sensors, as but a few examples. Item(s) can be loaded by personnel of the site, or vendors located on the site, or by any other suitable service helper. However, items can also be loaded by a machine. Still further, in alternate embodiments, a robot can be capable of self-loading an item for delivery.

A method 200 can include a robot determining if navigation to a delivery location has been successful 214. Such an action can include a robot utilizing autonomous navigation systems to attempt to reach the delivery location. If a robot determines it has not successfully navigated to the delivery location (N from 214), a method 200 can indicate delivery was not successful 222. Failure to navigate to a delivery location can take the form of any of those described herein, including extrinsic and intrinsic circumstances, as well as a timeout condition. In some embodiments, a robot can indicate or record the reasons why it was not successful, as noted herein.

If a robot determines it has successfully navigated to the delivery location (Y from 214), a method 200 can include indicating the arrival of the item(s) at the delivery location 216. Such an action can include any of: an indication by the robot itself, an indication by a system on site, or an indication by personnel at the site. An indication by the robot or system can include using any suitable communication system, including but not limited to a private or public network, including a LAN or cellular network, as well as the internet. Such an indication can be received by one receiving the item on a personal device (e.g., cell phone, computing device) or device at the site (e.g., display screen in room, phone call in room). A robot can also indicate arrival of the items with a local indication, including but not limited to: emitting an audio indication, activating a doorbell or other notifying device, or a physical knock on a door.

A method 200 can include a robot determining if the item(s) are delivered 218. Such an action can include any of: a robot utilizing sensors to sense whether item(s) have been taken; receiving or not receiving an input from a person indicating the item(s) have been taken, an input to another system on site (i.e., not the robot) that can be communicated to the robot. Sensors can include any of those described herein, or equivalents (e.g., door/lid, optical, weight). An input from a person can include an acknowledgement and/or authentication via a human interface on the robot. An input to the system can include an electronic communication from a person (i.e., text, phone call, or other electronic message). An action 218 can include a robot determining that the item(s) are not delivered, including a timeout condition while waiting at the delivery location. Embodiments can also include receiving explicit indications that item(s) are not delivered. As but two examples, a person can indicate the item(s) are denied for any of various reasons by an input to the robot or a system in communication with the robot. As particular examples, a person can indicate the item(s) are not what was requested, or the robot is at the wrong location.

If a robot determines it has successfully delivered the item(s) (Y from 218), a method 200 can include indicating delivery was successful 220. A robot can then eventually return to a first location 206, as described for embodiments herein.

If a robot determines it has not successfully delivered the item(s) (N from 218), a method 200 can indicate delivery was not successful 222. In some embodiments, a robot can indicate or record the reasons why it was not successful, as noted herein. A robot can eventually then return to a second location 208, as described for embodiments herein.

While embodiments include methods where a robot receives at item and request at the same location, embodiments can also include methods where a robot navigates to an intermediate "pick-up" location to receive the delivery item(s). One such embodiment is shown in FIG. 3.

FIG. 3 is a flow diagram of a method 300 according to a further embodiment. A method 300 can be executable by a robot and can include autonomous actions by the robot. In a very particular embodiment, method 300 can be one implementation of the "delivery successful determination" operation shown as 104 in FIG. 1.

A method 300 can include receiving intermediate and delivery locations 302. Such actions can include a robot receiving such information in a delivery request. In some embodiments, such actions can include any of those described for 102 in FIG. 1, or equivalents. A method 300 can include a robot determining if navigation to an intermediate location has been successful 324. Such an action can include a robot utilizing autonomous navigation systems to attempt to reach the intermediate location. If a robot determines it has not successfully navigated to the intermediate location (N from 324), it can record data related to the failure to navigate (e.g., record reason for failure) 326. A method 300 can also indicate delivery was not successful 322. Failure to navigate to an intermediate can take the same general form as those described in relation to failure to navigate to a delivery location. It is understood that an intermediate location can be different from a first or second location. While intermediate locations can be any suitable location at an operating site, two of many possible intermediate locations can include a laundry location, where laundry can be the items that are picked up and delivered by the robot, or a restaurant, where meals can be picked up and delivered by the robot.

As in the case of delivery locations, an intermediate location can be a stationary location or a moving location.

If a robot determines it has successfully navigated to the intermediate location (Y from 324), the robot can determine if item(s) are received 312. Such actions can include any of those described for 212 in FIG. 2, or equivalents. If a robot determines it has not successfully received item(s) for delivery (N from 312), it can (optionally) record data related to the failure and indicate delivery was not successful (326 and 322).

If a robot determines it has successfully received item(s) for delivery (Y from 312), the robot can determine if it has successfully navigated to the delivery location 314. Such actions can include any of those described for 214 in FIG. 2, or equivalents. If a robot determines it has not successfully navigated to the delivery location (N from 314), it can (optionally) record data related to the failure and indicate delivery was not successful (326 and 322).

If a robot determines it has successfully navigated to the delivery location (Y from 314), the robot can determine if the object has been delivered 318. Such actions can include any of those described for 218 in FIG. 2, or equivalents. If a robot determines the object has not been delivered (N from 318), it can (optionally) record data related to the failure and indicate delivery was not successful (326 and 322).

If a robot determines it has successfully delivered the item(s) (Y from 318), a method 300 can include indicating delivery was successful 320, and a robot can eventually return to a first location 306, as described for embodiments herein.

If a robot determines delivery was not successful 322, it can eventually return to an intermediate location, a second location, or both locations 308, as described for embodiments herein. At such a second or intermediate location, the delivery failure can be indicated by the robot (e.g., open bin and display item(s)), as described herein. In addition or alternatively, the failure can be addressed (e.g., retried, modified, cancelled, etc.).

While embodiments can include methods, systems and robots that can deliver items based on delivery locations and an intermediate location, embodiments can also include item delivery based on multiple delivery locations and/or multiple intermediate locations. One such embodiment is shown in FIG. 4.

Figure 4:
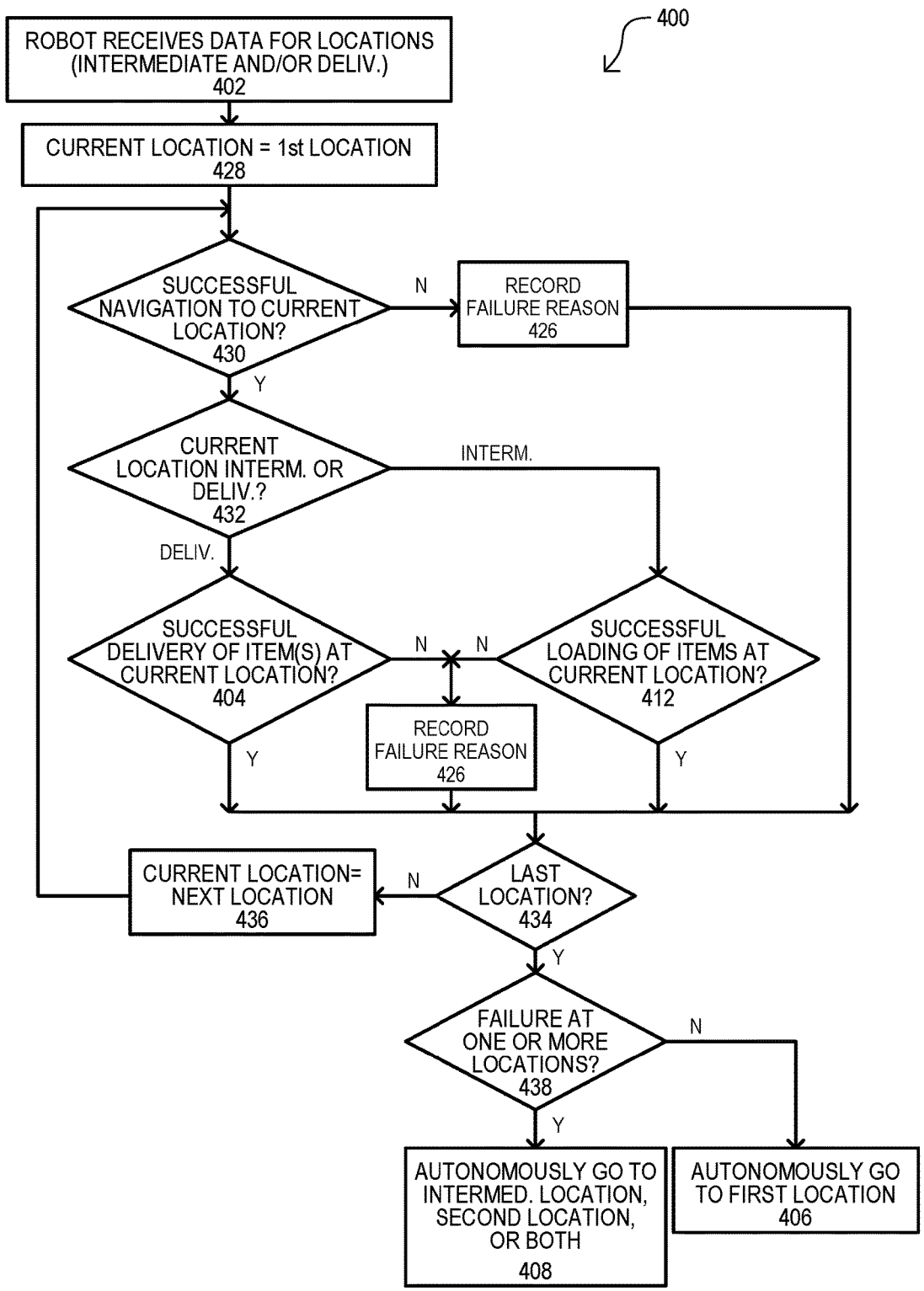
FIG. 4 is a flow diagram of a method according to a further embodiment.

FIG. 4 is a flow diagram of a method 400 according to another embodiment. A method 400 can be executable by a robot and can include autonomous actions by the robot to deliver items based on more than one delivery location, and/or more than one intermediate location.

A method 400 can include receiving data for intermediate and delivery locations 402. Such actions can include a robot receiving such information in delivery requests. In some embodiments, such actions can include any of those described for 102 in FIG. 1, or equivalents. It is understood that action 402 can result in a robot receiving or generating a sequence of locations to travel to, where the locations can be delivery locations or intermediate locations. Further, the sequence of locations can be static or dynamic. Once a robot has its sequence of locations, the robot can set a current goal to a first location in the sequence of locations 428.

A method 400 can include a robot determining if navigation to the location of the current (goal) location has been successful 430. Such an action can include a robot utilizing autonomous navigation systems to attempt to reach the current goal location. If a robot determines it has not successfully navigated to the current location (N from 430), it can optionally record data related to the failure to navigate (e.g., record reason for failure) 426, and then go to action 434.

If a robot determines it has successfully navigated to its current goal location (Y form 430), a method 400 can take different actions depending upon whether the current location is an intermediate location or a delivery location 432. If the current location is a delivery location (DELIV. from 433), a robot can determine if item(s) have been successfully delivered 404. In some embodiments, such actions can take the form of those described for action 104 in FIG. 1, and equivalents. If a robot determines an object has not been successfully delivered (N from 404), it can optionally record data related to the failure to deliver (e.g., record reason for failure) 426 then go to action 434. If a robot determines an object has been successfully delivered (Y from 404), it can go to action 434.

If the current location is an intermediate location (INTERM. from 432), a robot can determine if item(s) have been received 412. In some embodiments, such actions can take the form of those described for action 212 in FIG. 2, and equivalents. If a robot determines an object has not been received (N from 312), it can optionally record data related to the failure 426 and go to action 434. If a robot determines an object has been received (Y from 312), it can go to action 434.

At action 434, a robot can determine if it is at a last location in its sequence of locations. If the current location is not the last location (N from 434), a robot can update its goal to a next location 436, and then attempt to navigate to such a location (go to 430).

If a robot has reached a last location (Y from 434), the robot can determine if there was a failure at any of the locations in the sequence 438. If there were no failures (N from 438), the robot can return to the first location 406. However, if there was a failure (Y from 438) a robot can go to the intermediate location, second location, or both such locations 408. First, second, and intermediate locations can take the forms of any of those described herein, and equivalents.

Additional, more particular embodiments will now be described. Such embodiments can be particular implementations of all, or portions of those described in FIGS. 1-4.

Figure 5:
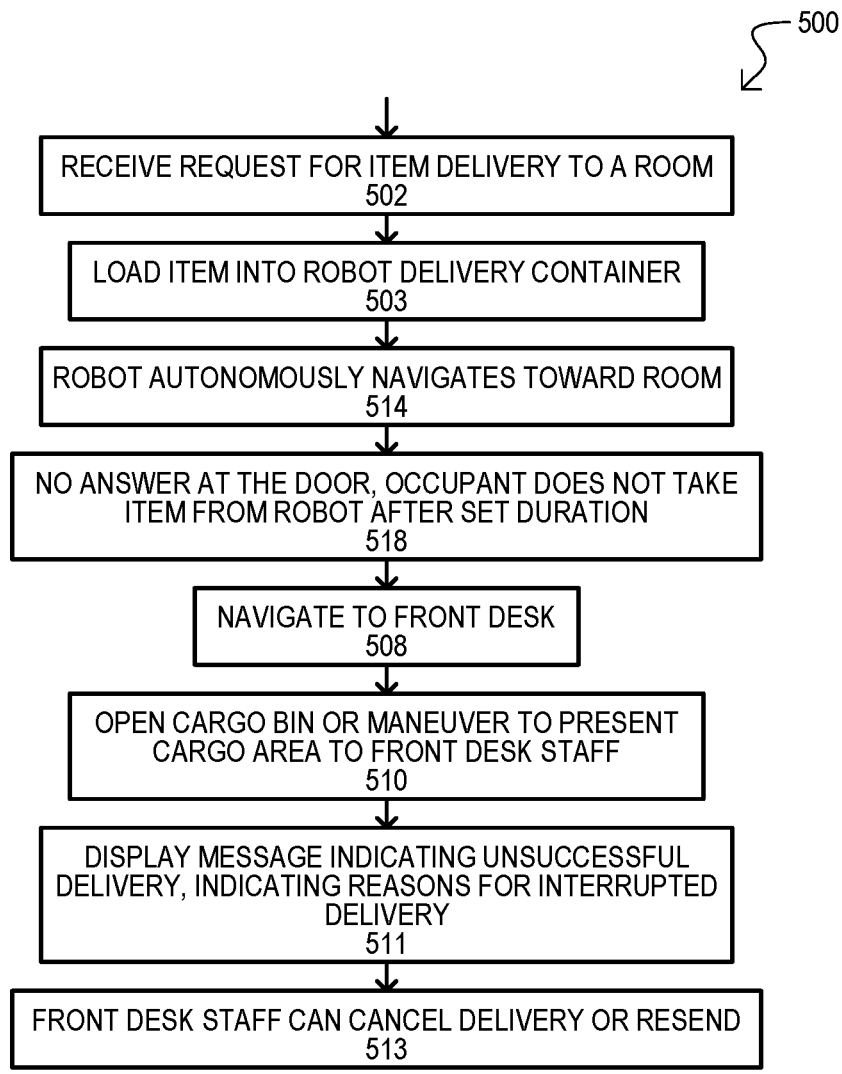
FIG. 5 is a flow diagram of a method according to another embodiment.

Handling of an interrupted or frustrated delivery by an autonomous robot, according to another embodiment, is illustrated with respect to FIG. 5. FIG. 5 shows a method 500 for handling delivery in a hotel, conference center, care facility, or similar environment that can include receiving a request for an item delivery to a room 502. An item can be loaded into a delivery container of a robot 503. While such an action can be automated in some embodiments, in other embodiments, such an action can be performed by a person, such as a front desk staff member, a hotel item vendor, or other service helper.

After being loaded with the item, a robot can autonomously navigate toward a room 514. In certain embodiments, the robot can navigate through corridors, signal and ride elevator cars in multi-level buildings, and maneuver around or avoid obstacles in an autonomously determined path to the room. The robot, a system, or a person (e.g., front desk) can signal the presence of the robot to a room occupant. If, after a set time duration, the room occupant does not open the door to accept delivery, the robot can determine that the delivery has failed 518. Alternatively, the person receiving the item may inspect the item but not take delivery (for example, if the wrong type of item is in the cargo bin), again resulting in a delivery failure.

Instead of returning to a normal wait or charge station, in the case of delivery failure, the robot can navigate to a front desk, or other predetermined area 508. Upon reaching the front desk, the robot can take various actions. Such actions can include opening its cargo bin (or alternatively, maneuvering to display an open cargo area or shelf) so that the undelivered item is displayed to front desk staff 510. In addition or alternatively, such actions can include some sort of message notification 511, which can include, as but a few examples, providing a text display or audio message from its supported tablet, display, or speaker; electronically send a phone message, text message, hotel staff screen status indicator, or a pop-up message to indicate reasons for an unsuccessful or interrupted delivery. As understood from the embodiments described herein, messages can indicate failure of the delivery target to pick-up the item, problems in timely navigating to a room, or physical blockage of a pathway to the room, as but a few examples. Front desk staff can take various actions in response to a robot having a delivery failure 513, including, as but a few examples, canceling the delivery, or after verification that delivery is still wanted, resending the robot to make another delivery attempt.

In another particular embodiment, intermediate loading site or sites can be used. This can include, for example, an intermediate laundry storage facility where towels, pillows, or blankets can be loaded. Alternatively, a restaurant or food service area can be an intermediate location, with the robot moving from a charge station near a front desk, to a kitchen, restaurant, or food service area for loading of food or drinks to be delivered to a hotel room or other destination.

Figure 6:
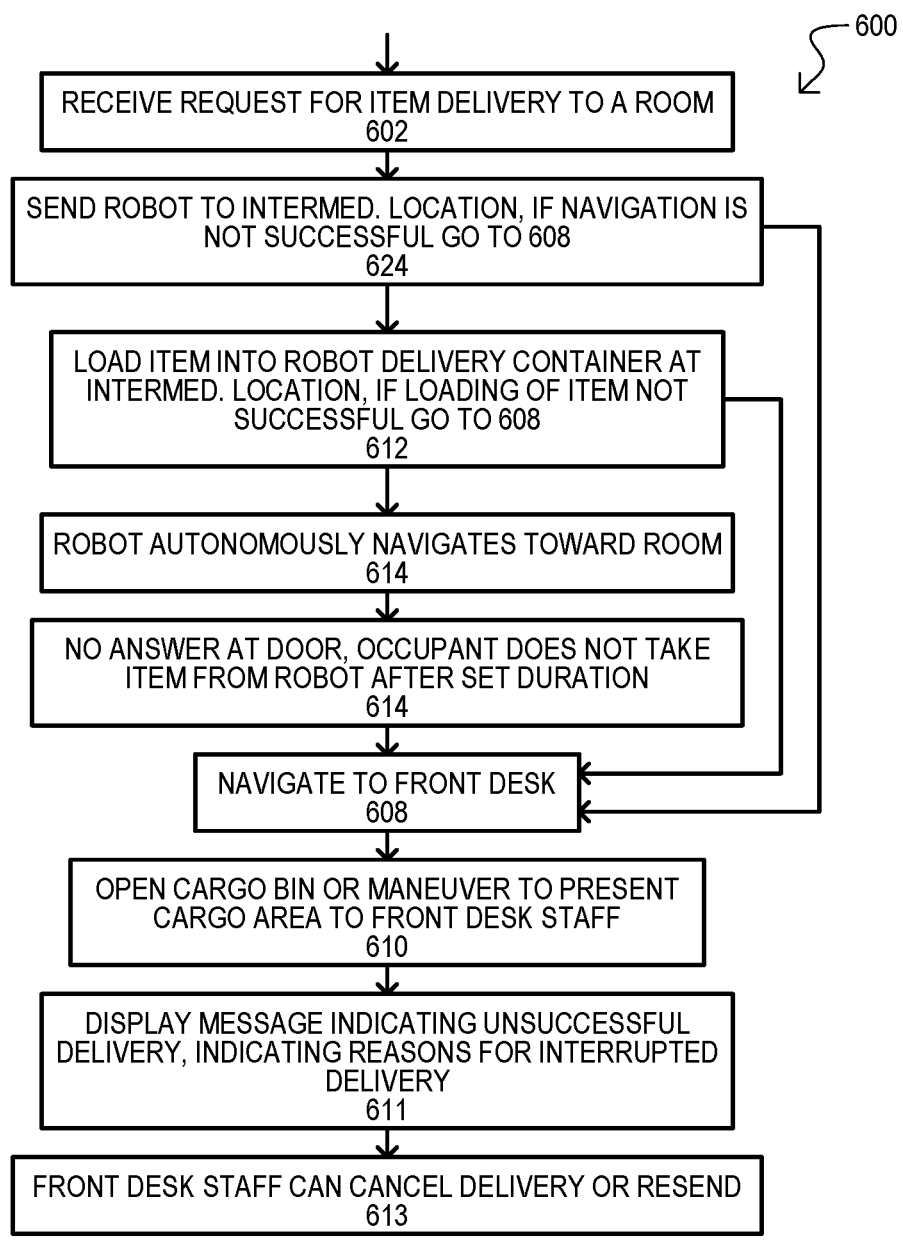
FIG. 6 is a flow diagram of a method according to another embodiment.

Referring to FIG. 6, a method 600 can include receiving a request for an item delivery to a room 602. A robot can be sent from an initial location to an intermediate location for item pick-up 624. If the robot is unable to successfully navigate to the intermediate location, a method can take action 608. If the robot navigates to the intermediate location, the item can be loaded into a delivery container of a robot 612. Such an action can be by a service helper, which can include service people, other robots, or automated item delivery mechanism. If the item is not successfully loaded at the first location, a method can take action 608.

After being loaded with the item, a robot can autonomously navigate to the delivery location (e.g., selected room) 614. After navigating to the delivery location, a method can include action 618, which in some embodiments, can be the same as 518 in FIG. 5.

As in the case of FIG. 5, in the event of a delivery failure, instead of returning to a normal wait or charge station, the robot can navigate to another location (e.g., front desk) 608. A robot can then go through any of actions 610, 611, and 613, which can be the same or equivalent to 510, 511, and 513, respectively, of FIG. 5.

While embodiments include a robot navigating back to a predetermined location (e.g., front desk) in the event of a delivery failure, in embodiments that include intermediate locations, a robot can navigate back to the intermediate location instead of a second location. One such embodiment is shown in FIG. 7.

Figure 7:
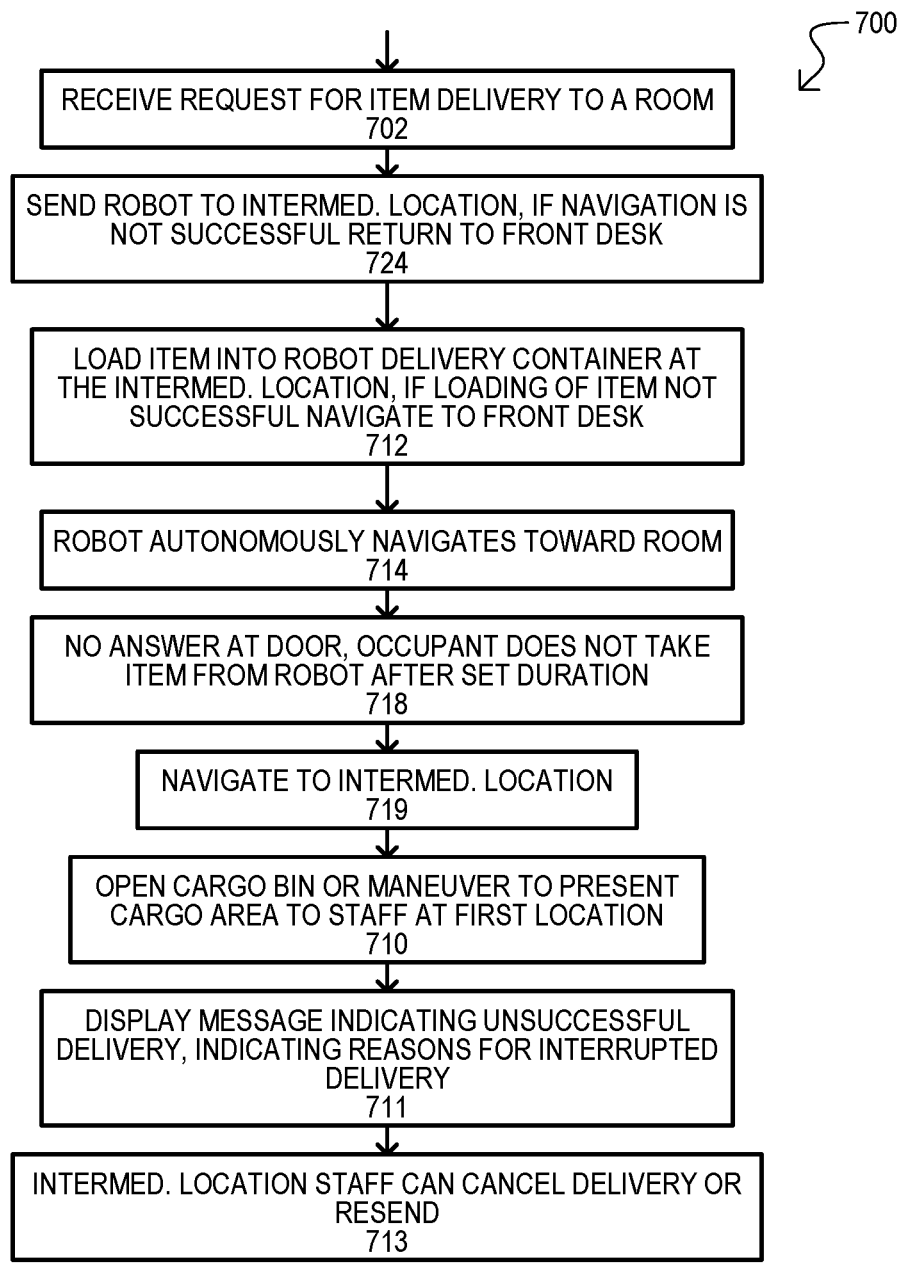
FIG. 7 is a flow diagram of a method according to another embodiment.

FIG. 7 shows a method 700 according to a further embodiment. In the method 700 of FIG. 7, an intermediate loading location or locations similar to that discussed with respect to FIG. 6 can be used. However, instead of navigating to the front desk if delivery is not successful, the robot can autonomously navigate back to the intermediate location (e.g., a laundry or a restaurant).

Method 700 can include receiving a request for an item delivery to a room 702. As in the case of FIG. 6, a robot can be sent from an initial location to an intermediate location (e.g., a restaurant, kitchen) for item pick-up, and if the robot is unable to successfully navigate to the intermediate location, the robot can return to a predetermined location different from the initial location (e.g., the front desk) 724.

Also like FIG. 6, if the robot is able to navigate to the intermediate location, the item(s) can be loaded into a delivery container of a robot, and if the item(s) is not successfully loaded at the first location, the robot can return to the predetermined location (e.g., front desk) 712. After being loaded with the item(s), the robot can autonomously navigate toward the selected room 714.

A robot, system, or person (e.g., or front desk) can signal the presence of the robot to a room occupant, like FIG. 6. However, unlike FIG. 6, if a robot determines a delivery has failed 718, the robot can navigate back to the intermediate location (e.g. restaurant, laundry) 719.

Upon the robot reaching the intermediate location, the robot can then go through any of actions 710, 711, and 713, which can be the same or equivalent to 510, 511, and 513, respectively, of FIG. 5. However, if such actions involve people, they can be personnel at the intermediate location, and not the second location.

In other embodiments, multiple intermediate locations, delivery locations, or other destinations are supported. For example, a robot can be loaded with items from multiple intermediary locations to deliver to multiple rooms. In such embodiments, unsuccessful loading or deliveries may not result in immediate return to the front desk by the robot. In an example situation, a robot can make as many deliveries as possible before returning to an intermediary location or front desk. For example, a robot delivering complimentary items such as newspapers to multiple rooms can skip a room if it is blocked or unable to navigate to the room, and later notify the front desk that the complimentary item was not left at the room.

Figure 8:
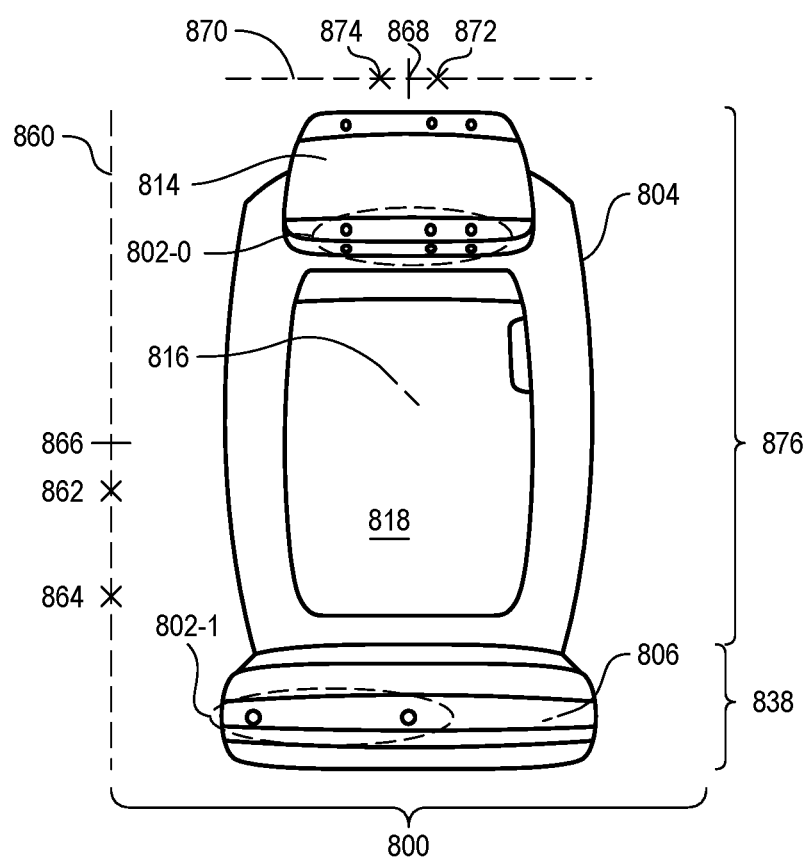
FIG. 8 is a diagram showing a robot that can be included in embodiments.

FIG. 8 is a view of a service robot 800 suitable for embodiment described herein. A robot 800 can include a body 804 having an elongated shape with a structure 816 formed therein for transporting items as described herein (e.g., container, cargo space). A robot 800 can include sensors for navigating in an environment. In the embodiment shown, robot 800 includes top mounted sensors 802-0 and bottom mounted sensors 802-1, as well as a user interface 814 and movement system 806 formed within a base 838 of body 804.

A robot 800 can autonomously navigate, as described herein, through changeable indoor or outdoor environments, including but not limited: to hotels, convention centers, medical or care centers, indoor or outdoor restaurants, open air city plazas, or the like.

In some embodiments, a robot containing items for delivery can be configured to evade stationary and moving obstacles to reach a desired location (e.g., initial, delivery or intermediate). Robot 800 can navigate from one location through an environment (e.g., hallway) with various obstacles to another location (e.g., the delivery location or zone) which can be positioned adjacent to a door, in particular embodiments. In some embodiments, such operations can include the robot 800 maneuvering through a hallway, navigating to evade obstacles such as a cart and a person, in order to position itself in a destination location in front of a doorway.

In some embodiments, features at a delivery location can be used to identify and/or confirm a delivery zone. In particular embodiments, a robot can orient itself in a predetermined fashion to provide easy access to the items. In one embodiment, once a robot has arrived at delivery zone adjacent to a door corresponding to the ordering guest's room, a robot 800 can complete delivery upon the door opening. In some embodiments, this can include unlocking a container with the item to be delivered. In addition or alternatively, a robot 800 can navigate to the delivery zone and rotate in place to present a container with a delivery item in a position easily retrievable by the guest. When the door opens, the robot 800 can complete authentication and allow pickup of the items in the container by the guest. In some embodiments, this can include unlocking and/or opening a lid of the container. Authentication can take any suitable form, including using the opening of the pre-selected door as a portion of the authentication process.

To identify a delivery zone or assist in the identification of a delivery zone, a robot can use image sensors, depth sensors, position sensors, or the like. The sensors can be used to identify room numbers and determine if opening of a door has occurred. Active and/or passive identification systems can also be used, including but not limited to RFID tags, Bluetooth beacons, QR coded markings, ultrasonic emitters, or other suitable area or target identification mechanism or marking system. While such sensors can be mounted on the robot itself, in some embodiments, all or a portion of the sensors can be separate from the robot, but can transmit sensor data to the robot, or have such data be retrieved by the robot.

In one embodiment, in determining a designated delivery zone at a delivery location, and assisting in authentication, a robot can use a precomputed (if door sizes are standardized) or locally determined three-dimensional (3D) door opening model. For example, once a robot 300 is localized in front of a door, it can detect the state of the door (open or closed) by using depth or other suitable 3D sensors to measure door dimensions and position. Typically, a door is positioned on a plane that is perpendicular to the floor, and rotates on hinges. As the door opens and closes, it sweeps out an arc along the floor. The 3D sensor data is fit to this model of the door and its surrounding walls. By comparing the orientation of the sensed door plane to the detected walls and the map, a can robot estimate the angle of the door, determines whether it is in an open or closed state, and can determine whether the door opening will contact the robot. The robot can use the model to locate itself in a position that allows for ease of delivery, while preventing contact with the opening door. In certain embodiments, the robot can position itself in a non-blocking position to allow entry or exit of guests through the doorway even during delivery.

In some building types, such as hotels, doors are normally locked and often open inward. A person present in the room, or a person who can open the door has been authenticated to a certain extent by the hotel. For hotel delivery of inexpensive items, this level of authentication can be sufficient for many applications. In practice, the robot can be programmed to unlock a bin or cargo carrier so that a person can remove its load once the robot detects that the door is open. Individual hotels or institutions can augment this authentication technique with others if needed, such as asking the person receiving the delivery to personally authenticate receipt of the item. Such personal authentication can include using a robot interface (e.g., signing at interface, use of a tablet mediated video interface with a hotel employee, detection of a guest key card with RFID or magnetic strip, use of personal identification number (PIN) generated for a guest at check-in) or other suitable means. More advanced biometric techniques including but not limited to fingerprint, voice analysis, or facial image identification can also be used.

In some embodiments, removal of a delivered item can be presumed, and the lid/door can automatically close and relock. In other embodiments, active measures can be utilized to confirm the item(s) have been removed, including but not limited to weight or pressure sensors, RFID tags, imaging, ultrasonic sensors.

As will be appreciated, various procedures can be used for deliveries. For example, in some embodiments, one or more types of delivery may not require a locked container, with the robot simply being loaded with an item and autonomously maneuvering to a delivery zone, authenticating (i.e., detecting when the door opens), and the item(s) can be presented for delivery.

In another delivery procedure, an item can be placed in lockable container inside or to one side (e.g., rear) of a robot, where the robot can maneuver to a delivery zone (e.g., door), authenticate (e.g., interact with a guest), and rotate to present a side or rear container holding item(s) for delivery.

While embodiments can include a delivery zone that is relative to a door in a hotel, any suitable location can serve as a delivery zone. For example, delivery zones can include, but are not limited to: an entryway or threshold area, any suitable defined location, a designated restaurant tables, a guest occupied reception or meeting room chair, or a poolside lounge. Still further, a biometrically identified guest can serve as, or be used to derive, a delivery zone.

While embodiments show a robot delivering items to a guest, delivery can be for any other suitable task. For example, a robot can be used to deliver cleaning supplies or materials to carts of cleaning staff, while in other embodiments robots can deliver items to other robots for later pickup.

Referring still to FIG. 8, in certain embodiments, any of sensors 802-0/1 can include position, depth or similar sensor systems. As noted above, sensors 802-0/1 can be mounted on or near the top of the robot, as well as on the base, or both. Sensors 802-0/1 can be used when the robot autonomously navigates from location to location.

In particular embodiments, a user interface 814 can be a touchpad or similar device, which can be accessed by a user to interface with the robot 800. In this way, a delivery robot 800 can be designed for stability when stationary or moving, resistance to fall-over or tipping, and can maximize interior cargo space for a given body volume.

A robot 800 can have a low center of gravity for stability when both loaded and unloaded. A low center of gravity can be a center of gravity lower than a vertical midpoint of a robot 800. For example, line 860 of FIG. 8 represents the vertical extents of robot 800, and position 866 shows a vertical midpoint. In some embodiments, a center of gravity in an unloaded robot 800 can be in a lower 80% of a robot's height, as represented by position 864. Still further, in some embodiments, even when loaded, a robot 800 can have a low center of gravity. For example, for loads having a weight up to that of the robot, a center of gravity can remain in a lower 45% of the robot height, as represented by position 862.

In a similar fashion, a robot center of gravity can be centrally located in a lateral direction. For example, line 870 represents the lateral (horizontal) extents of robot 800, and position 868 shows a lateral midpoint. In some embodiments, a center of gravity in an unloaded robot 800 can be within 20% of a robot's lateral midpoint 868. This is represented by positions 872 and 874.

Drive propulsion, battery systems, and at least some portion of the control electronics can be positioned in a base 838 that is connected to and supports a roughly cylindrical cargo carrying portion 876 of the body 804. A base 838 can be a modular component of the delivery robot 800, with various types of cargo carrying casings preferentially mounted for differing applications or delivery needs.

A container 816 (or removable cargo containers, not shown) can be securable, including lockable, and arranged for easy access by a user. While FIG. 8 shows a container 816 accessible via a door 818 formed in a front of robot, it is understood that embodiments can include containers accessible via a side of the robot, a back of the robot, a top of the robot, or combinations thereof. According to embodiments, containers can maximize an internal space of a body 804. In the embodiment shown, a container 816 can occupy a majority of the total height of the robot, as well as the majority of the cargo carrying portion 876.

Figure 9:
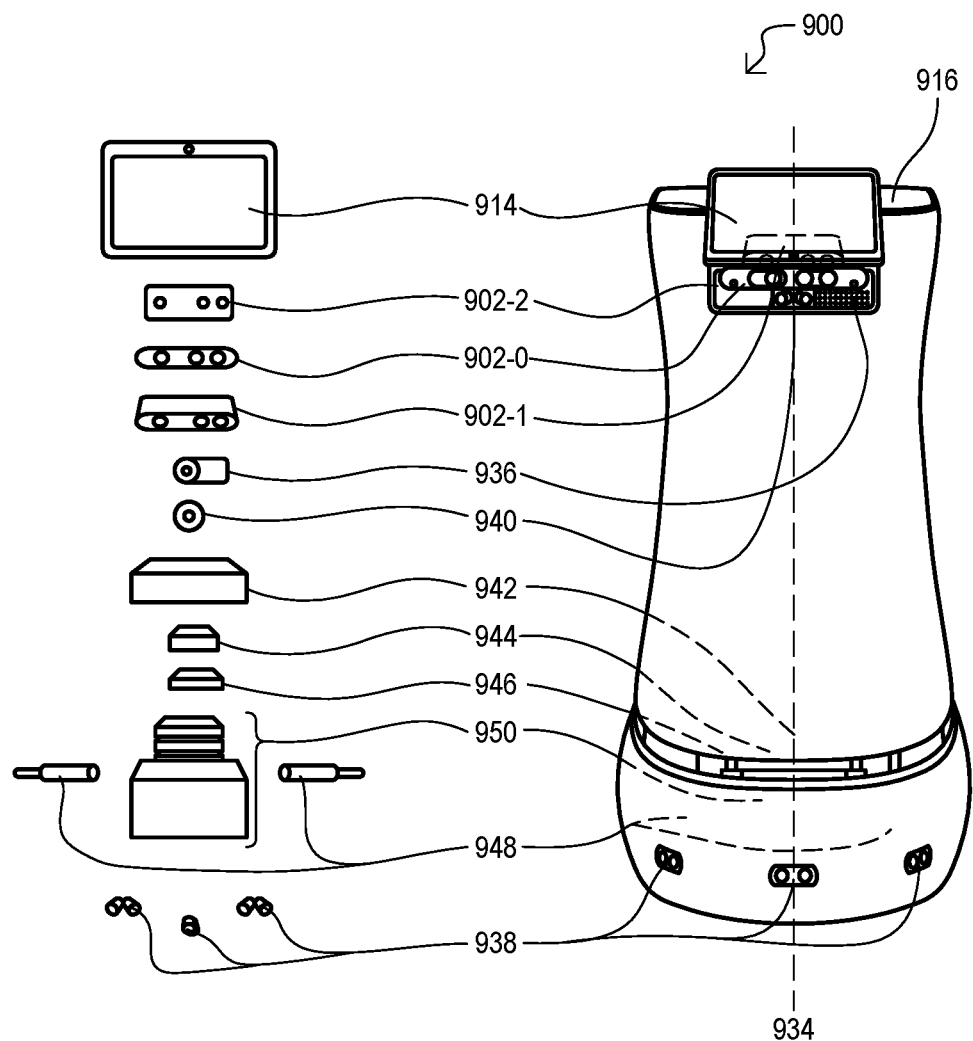
FIG. 9 is a diagram of another robot that can be included in embodiments.

FIG. 9 shows a robot 900 that can be included in embodiments described herein, as well as selected components of the robot 900 in an exploded view. In some embodiments, robot 900 can be one very particular implementation of robot 800 shown in FIG. 8.

A robot 900 can have a generally cylindrical shape about a vertical midline 934. Advantageously, this shape can simplify movement calculations and rotation in place, since position and potential interactions of objects with extending arms or the like do not have to be determined. A touch tablet computing device (tablet) 914 can be included for user input and/or messaging, and can be mounted at the top of the robot 900 at an angle convenient for viewing and user input. In addition to providing a visible display and/or touch input, a tablet 914 can be used speech input/output, and/or for processing and controlling the robot 900.

In some embodiments, a storage container 916 can be included within a body 904 of the robot 900, positioned behind the tablet 914. In some embodiments, storage container 916 is securable. In particular embodiments, storage container 916 is lockable, and can be controlled to unlock for delivery to a recipient only when a destination has been reached and authorization to unlock received.

In FIG. 9, robot 900 can support multiple fixed depth sensors, including a forward-looking depth sensor 902-0 and a downward looking depth sensor 902-1 mounted adjacent to each other. In the disclosed embodiment, the depth sensors (902-0/1) can be fixedly mounted in a manner that does not require a turret or movable actuators. In some embodiments, depth sensors 902-0/1 can operate in conjunction with a depth sense video camera 902-2 to determine the presence and location of local objects/obstacles. In very particular embodiments, a depth sense video camera 902-2 can be an RGB CMOS type video camera.

In addition to depth sensors, a robot 900 can include one or more other sensors. As but two examples, a robot 900 can further include a base mounted sonar array 938 and a wide-angle sonar 940 mounted near a top of the robot 900.

A robot 900 can be controlled by one or more processors executing stored instructions that can be responsive to sensor inputs and/or transmitted inputs. In a particular embodiment, an x86 or similar central processing unit 942 can be used in conjunction with one or more microcontrollers 944 and motor controllers 946 for local control of movement of the robot 900. Processing unit 942 can be programmed to execute the robot operations described herein, and equivalents.

In some embodiments, one or more speakers 936 separate from the tablet 914 can also be included for providing audible instructions and/or notices.

In the robot 900 of FIG. 9, differential drive motors 948 powered by batteries 950 can provide movement by driving wheels (not shown) that support the robot 900. In particular embodiments, batteries 950 can be lithium ion or some other battery type, rechargeable battery systems being preferred. A drive mechanism includes separate drive motors 948 each attached to its own wheel, in a differential drive configuration. In some embodiments, such a drive mechanism can allow for a robot velocity of 1.5 meters/second, and the ability to move up and down ramps, as well as on level ground. In a particular embodiment, a robot 900 can include two drive wheels between 4-8 inches in diameter, preferably about six inches in diameter.

According to embodiments, a robot 900 can be sized to have a height of between 0.8 to 2 meters, preferably between 1.2 to 1.5 meters preferred, and a diameter of between 30-60 centimeters, preferably between 40-50 centimeters. Such physical dimensions can enable robot 900 to easily move through hallways and doorways.

While various methods and systems are understood from the above embodiments, a further system will now be described with reference to FIG. 10.

Figure 10:
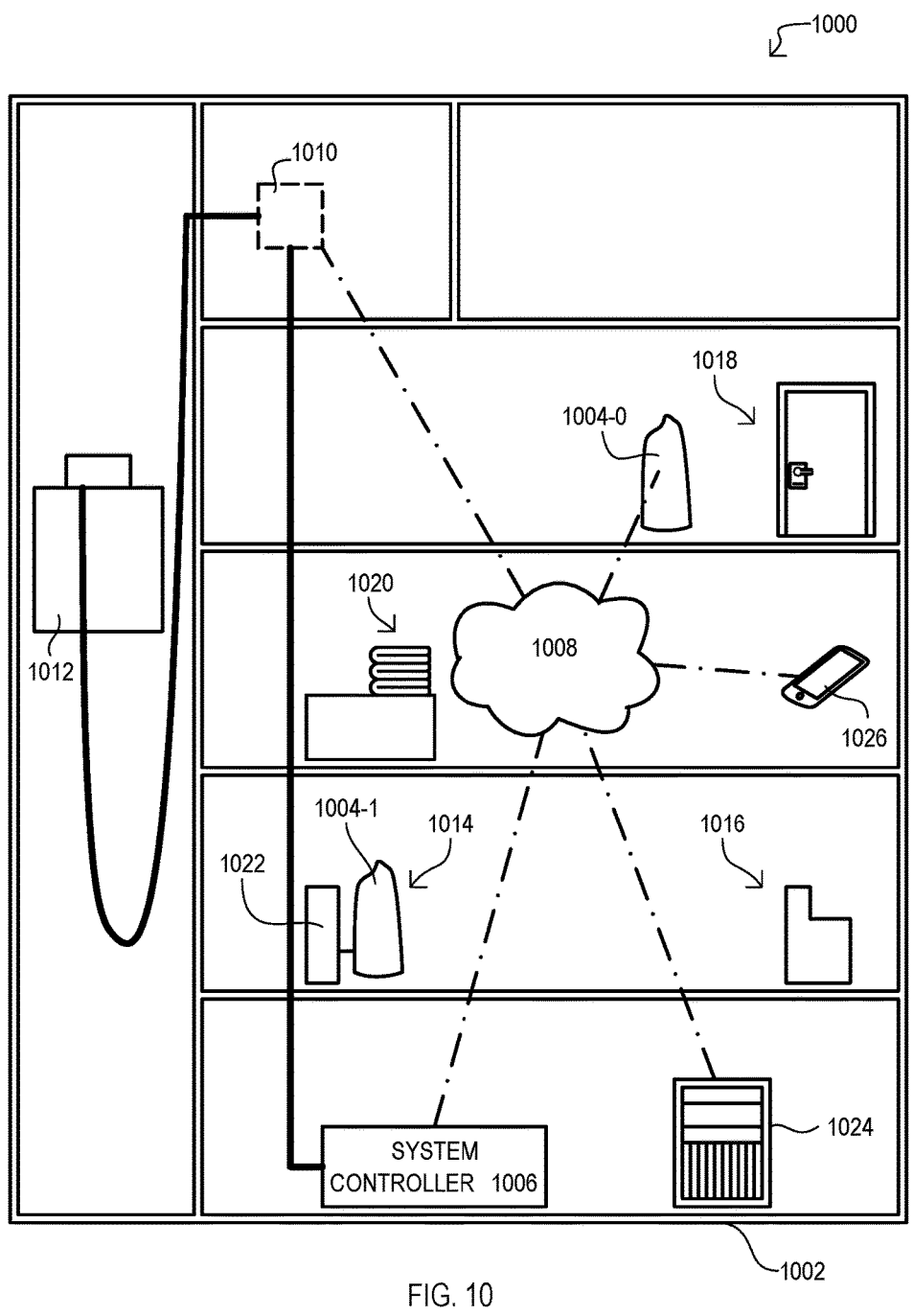
FIG. 10 is a diagram showing a system according to an embodiment.

FIG. 10 is diagram showing a system 1000 according to an embodiment. A system 1000 can exist at a site 1002 where robots (two shown as 1004-0/1) can autonomously navigate between various locations. A system 1000 can include robots 1004-0/1, a system controller 1006, and a communication system 1008. In some embodiments, a system 1000 can include an elevator control unit 1010 to enable robots 1004-0/1 to use elevators 1012 to travel between floors.

Robots 1004-0/1 can take the form of any of those shown herein, or equivalents.

A system controller 1006 can communicate with one another via communication system 1008. Robots 1004-0/1 can receive delivery requests via wireless communication system 1008. Requests can originate from any of various locations as will be described in more detail herein. A system controller 1006 can control elevator control unit 1010 to enable robots 1004-0/1 to ride elevators 1012. In addition or alternatively, robots 1004-0/1 themselves can control elevators 1012.

A site 1002 can include various locations as described herein. Locations can include a first location 1014, a second location 1016, various delivery locations 1018, and one or more intermediate locations 1020. Robots 1004-0/1 can navigate to, and between, such locations as described herein, or equivalents. A first location 1014 can be a default return site for robots 1004-0/1 when they are not executing tasks. In a particular embodiment, a first location 1014 can include one or more charging stations 1022 to charge robots when they are between tasks. A second location 1016 can be a location where robots 1004-0/1 can navigate to when tasks are not completed as described herein. In particular embodiments, a second location 1016 can be a front desk, or the like, where decisions can be made as to whether task should be retried, modified, or cancelled. A delivery location 1018 can be a destination location for item(s) delivered by robots 1004-0/1. In particular embodiments, delivery locations 1018 can include rooms. However, as noted herein, delivery locations can take various other forms. Intermediate locations 1020 can be locations different from first and second locations (1014, 1016) and can be locations robots navigate to when on their way to a location where an action is to be performed. In some embodiments, intermediate locations 1020 can be locations where robots 1004-0/1 can receive items for delivery. As noted above, two of many possible examples of intermediate locations can be a laundry or restaurant.

In some embodiments, robots 1004-0/1 can receive requests by entry of data at a human interface of the robot itself (e.g., touchpad). In addition or alternatively, robots 1004-0/1 can receive requests over communication system 1008. Such requests can originate from any suitable source, including but not limited to any of the locations 1014, 1016, 1018, 1020, the system controller 1006, a server 1024 (which can be at the site, or remote from the site), or some other authorized personal device 1026 (e.g., cell phone, personal computing device, etc.).

It will be apparent to those skilled in the art that various modifications and variations can be made without departing from the spirit or scope of the invention. Thus, it is intended that the disclosed embodiments cover modifications and variations that come within the scope of the claims that eventually issue in a patent(s) originating from this application and their equivalents. In particular, it is explicitly contemplated that any part or whole of any two or more of the embodiments and their modifications described above can be combined in whole or in part.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that other embodiments of this invention may be practiced in the absence of an element/step not specifically disclosed herein.

What is claimed is:

1. A method, comprising:
   while a robot is at a first location, receiving a request at an electronic interface of the robot to deliver at least one physical item to a deliver location;
   processing the request with at least one processor of the robot;
   in response to processing the request, by operation of an autonomous navigation system of the robot, the robot attempting to navigate from the first location to the delivery location and attempting to deliver the at least one physical item at the delivery location;
   by operation of the at least one processor, determining if the at least one physical item is successfully delivered;
   if the robot determines delivery of the at least one physical item is successful, the robot navigating with the autonomous navigation system from the delivery location to the first location;
   if the robot determines delivery of the at least one physical item is not successful, navigating to another location different from the first location; and
   upon arriving at the other location, by operation of the at least one processor, generating an indication of a delivery failure.

2. The method of claim 1, wherein:
   attempting to deliver the at least one physical item includes
     by operation of that at least one processor, determining if the robot has successfully navigated to the delivery location,
       if the robot determines it cannot navigate to the delivery location, the robot determining that delivery of the at least one physical item is not successful.

3. The method of claim 2, wherein;
   by operation of that at least one processor, determining if the robot has successfully navigated to the delivery location, and
   if the robot determines it has navigated to the delivery location, by operation of the at least one processor, generating an indication that the at least one physical item has arrived at the delivery location.

4. The method of claim 1, wherein:
   attempting to deliver the at least one physical item includes by operation of the autonomous navigation system, attempting to navigate to an intermediate location that is different from the first location, by operation of the at least one processor, determining if the robot has successfully navigated from the first location to the intermediate location, if the robot determines it cannot navigate to the intermediate location, determining that delivery of the at least one physical item is not successful, if the robot determines it has navigated to the intermediate location, by operation of that at least one processor, the robot determining if it has received the at least one physical item, if the robot determines it has not received the at least one physical item, determining that delivery of the at least one physical item is not successful, and if the robot determines the at least one physical item is received, by operation of the autonomous navigation system, attempting to navigate from the intermediate location to the delivery location, by operation of the at least one processor, determining if the robot has successfully navigated from the intermediate location to the delivery location, and if the robot determines it cannot navigate to the delivery location, determining that delivery of the at least one physical item is not successful.

5. The method of claim 4, wherein:

by operation of the at least one processor, determining if the robot has successfully navigated from the first location to the intermediate location, if the robot determines it cannot navigate to the intermediate location, by operation of the autonomous navigation system, navigating to the other location;

by operation of the at least one processor, determining if the robot has successfully received the at least one physical item at the intermediate location, if the robot determines it has not received the at least one physical item, by operation of the autonomous navigation system, navigating to the other location;

if the robot determines it cannot navigate to the delivery location, by operation of the autonomous navigation system, navigating to the other location.

6. The method of claim 4, wherein:

the intermediate location is the other location;

by operation of the at least one processor, determining if the robot has successfully navigated from the first location to the intermediate location, if the robot determines it cannot navigate to the intermediate location, autonomously navigating to a second location;

by operation of the at least one processor, determining if the robot has successfully received the at least one physical item at the intermediate location, if the robot determines it has not received the at least one physical item, by operation of the autonomous navigation system navigating to the second location;

if the robot determines it cannot navigate to the delivery location, by operation of the autonomous navigation system navigating to the second location; and if the robot determines the at least one physical item is not delivered, by operation of the autonomous navigation system autonomously navigating to the intermediate location.

7. The method of claim 1, wherein the first location comprises a charging station for the robot.

8. The method of claim 1, further including:

if the robot determines delivery of the at least one physical item is not successful, recording data related to a cause of the delivery not being successful.

9. A method for delivering physical items with an autonomously navigating robot, comprising:

at a first location, the robot receiving, via an electronic interface, a request to proceed to a delivery location;

the robot navigating to an intermediate location by operation of an autonomous navigation system of the robot, the intermediate location being different than the first location; and the robot receiving at least one physical item at the intermediate location;

the robot attempting to navigate to the delivery location by operation of the autonomous navigation system; and by operation of at least one processor of the robot, determining if delivery of the at least one physical item is successful, if the robot determines delivery of the at least one physical item is not successful, by operation of the autonomous navigation system, the robot navigatinq to a location other than the first location, and the robot indicating that the delivery of the at least one physical item was not successful.

10. The method of claim 9, wherein the first location includes a charge station for the robot.

11. The method of claim 9, wherein the delivery location includes, or is proximate to, a room having a door.

12. The method of claim 9, wherein:

by operation of the autonomous navigation system, the robot navigates to a second location in the following events;

by operation of the at least one processor, the robot determines it cannot navigate to the intermediate location, by operation of the at least one processor, the robot determines it has not received the at least one physical item, by operation of the at least one processor, the robot determines it cannot navigate to the delivery location, and by operation of the at least one processor, the robot determines that delivery of the at least one physical item is not successful at the delivery location; wherein the second location is different from the first location and the intermediate location.

13. The method of claim 9, wherein:

by operation of the autonomous navigation system, the robot navigates to a second location in the following events;

by operation of the at least one processor, the robot determines it cannot navigate to the intermediate location, by operation of the at least one processor, the robot determines it has not received the at least one physical item, and by operation of the at least one processor, the robot determines it cannot navigate to the delivery location, by operation of the autonomous navigation system, the robot navigates to the intermediate location in the event the robot determines that delivery of the at least one physical item is not successful at the delivery location; wherein the second location is different from the first location and the intermediate location.

14. A system, comprising:

a robot that autonomously navigates to various locations at a site, the robot comprising at least on processor responsive to sensor inputs from sensors on the robot and configured to physically position the robot at a first location when not executing tasks, receive requests to proceed to a delivery location, autonomously navigate the robot to the delivery location, determine if a delivery of at least one physical item at the delivery location is successful, autonomously navigate the robot to the first location if delivery of the at least one physical item successful, and autonomously navigate the robot to a second location if delivery of the at least one physical item is not successful, and upon arriving at the second location, generating an indication of a delivery failure.

15. The system of claim 14, further including:

a wireless communication network configured to provide wireless communication paths to the robot; and the at least one processor is further configured to receive the requests at a wireless interface to deliver the at least one physical item over the wireless communication network.

16. The system of claim 14, wherein:

the at least one processor is further configured to autonomously navigate the robot to an intermediate location to receive the at least one physical item;

determine if the at least one physical item is received at the intermediate location, and autonomously navigate the robot to the first location if delivery of the at least one physical item is successful, and autonomously navigate the robot to the second location if delivery of the at least one physical item is not successful.

17. The system of claim 14, wherein:

the at least one processor is further configured to autonomously navigate the robot to an intermediate location to receive the at least one physical item;

determine if the at least one physical item is received at the intermediate location, and autonomously navigate the robot to the first location if delivery of the at least one physical item is successful, and autonomously navigate the robot to the intermediate location if delivery of the at least one physical item is not successful.

* * * * *